US011822052B2

(12) United States Patent
Dai et al.

(10) Patent No.: US 11,822,052 B2
(45) Date of Patent: Nov. 21, 2023

(54) COLOUR WHEEL ASSEMBLY, LIGHT SOURCE SYSTEM, AND PROJECTION DEVICE

(71) Applicant: Appotronics Corporation Limited, Shenzhen (CN)

(72) Inventors: Da-Yan Dai, Shenzhen (CN); Hao Zhou, Shenzhen (CN); Yi Li, Shenzhen (CN)

(73) Assignee: Appotronics Corporation Limited, Shenzhen (CN)

(*) Notice: Subject to any disclaimer, the term of this patent is extended or adjusted under 35 U.S.C. 154(b) by 560 days.

(21) Appl. No.: 17/047,031

(22) PCT Filed: Dec. 3, 2018

(86) PCT No.: PCT/CN2018/118817
§ 371 (c)(1),
(2) Date: Aug. 9, 2021

(87) PCT Pub. No.: WO2019/196429
PCT Pub. Date: Oct. 17, 2019

(65) Prior Publication Data
US 2021/0373319 A1  Dec. 2, 2021

(30) Foreign Application Priority Data
Apr. 12, 2018 (CN) .......................... 201810326971.3

(51) Int. Cl.
*G02B 26/00* (2006.01)
*G03B 21/20* (2006.01)

(52) U.S. Cl.
CPC ......... *G02B 26/008* (2013.01); *G03B 21/204* (2013.01)

(58) Field of Classification Search
CPC ............ F21V 7/30; F21V 13/14; G02B 26/00
See application file for complete search history.

(56) References Cited

U.S. PATENT DOCUMENTS

2016/0238922 A1* 8/2016 Furuyama ............ G02B 26/008
2016/0252722 A1* 9/2016 Li .............................. F21V 9/08
362/84

FOREIGN PATENT DOCUMENTS

| CN | 103885274 A | 6/2014 |
| CN | 203810291 U | 9/2014 |
| CN | 105093776 A | 11/2015 |
| CN | 207164363 U | 3/2018 |

* cited by examiner

*Primary Examiner* — William J Carter
(74) *Attorney, Agent, or Firm* — ScienBiziP, P.C.

(57) ABSTRACT

A colour wheel assembly, a light source system provided with the same, and a projection device are provided, a boron nitride coating being arranged on the side of the colour wheel assembly corresponding to a red fluorescent area and the other side being provided with glass powder, and the two sides of a non-red fluorescent area both being provided with a glass powder coating layer. By means of arranging boron nitride material in a position corresponding to a red fluorescent area, as the boron nitride material has good thermal conductivity relative to the glass powder and the crystal structure of the boron nitride is a layered structure, having the effect of effectively blocking light and thereby further reducing the excitation light incident on the red fluorescent powder, attenuation of the red fluorescence under the direct excitation of strong excitation light can be effectively prevented.

20 Claims, 3 Drawing Sheets

COLOUR WHEEL ASSEMBLY, LIGHT SOURCE SYSTEM, AND PROJECTION DEVICE

TECHNICAL FIELD

The present disclosure relates to an optical field, particularly relates to a color wheel assembly and a light source system and a projection device using the color wheel assembly.

BACKGROUND

Nowadays, the technology of projection devices has developed rapidly and has been widely used. In a projection device, an excitation light source and a wavelength conversion device are the most critical components. Generally, the wavelength conversion device is a color wheel, which is provided with different phosphors to be irradiated by the excitation light in time sequence, and after irradiation of the excitation light, different kinds of excited light are generated.

Because the red phosphor powder is prone to light saturation under the excitation of the excitation light of excessively high intensity. That is, as intensity of the excitation light increases, amount of red fluorescence emitted by the red phosphor powder does not increase all the time; when the intensity of the excitation light increases to a certain level, the amount of red fluorescence emitted by the red phosphor powder will not increase, but decrease instead. The yellow/green phosphor powder can be excited under the excitation light with a relatively high intensity, and the light output efficiency will not decrease. Therefore, in order to ensure the stability of the excited light, it is necessary to continuously adjust the intensity of the excitation light so that the intensity of the excitation light when the red phosphor segment is on the excitation light path is lower than the intensity of the excitation light when the yellow/green fluorescence is on the excitation light path.

However, when the color wheel rotates at a high speed, adjusting a current of the excitation light may cause synchronization difficulties. That is, an adjustment pace of the excitation light may be inconsistent with a pace of the red phosphor segment and yellow/green phosphor segment of the color wheel on the excitation light path, therefore causing brightness attenuation of the red phosphor powder on the color wheel.

Therefore, it is necessary to provide a new color wheel assembly, and a light source system and a projection device to solve the above-mentioned problems.

SUMMARY

The present disclosure provides a color wheel assembly, a light source system, and a projection device, which can solve the problem of thermal quenching of red phosphors without real-time adjusting the current of the excitation light.

To solve the above technical problems, a technical solution adopted by the present disclosure provides a color wheel assembly, including an excitation light source for emitting excitation light and the color wheel assembly. The color wheel assembly is provided with a phosphor layer configured to receive the excitation light and emit excited light. The phosphor layer includes a red phosphor area containing a red phosphor and at least one non-red phosphor area that are time sequentially on the optical path of the excitation light; wherein one side of the red phosphor area is provided with a boron nitride coating, the other side of the red phosphor area is provided with a glass powder coating, and both sides of the non-red phosphor area are provided with glass powder coatings.

To solve the above technical problems, the present disclosure also provides a light source system including an excitation light source and the above-described color wheel assembly.

To solve the above technical problems, the present disclosure also provides a projection device including the above-described light source system.

The present disclosure has beneficial effect as following: different from the prior art, the red phosphor area of light source system of the present disclosure is provided with a boron nitride coating on one side, glass powder is provided on the other side, and glass powder coatings are provided on both sides of the non-red phosphor area. Compared with glass powder, boron nitride material has better thermal conductivity, and the crystal structure of boron nitride is a layered structure, by arranging boron nitride material at the corresponding position of the red phosphor area, it can effectively block light, and the excitation light incident on the red phosphor powder can be further reduced, which can effectively avoid attenuation of the red fluorescence under direct irradiation of high-intensity excitation light. Therefore, it is not necessary to adjust the intensity of the excitation light specifically for the red phosphor powder, keeping the same excitation light circuit can satisfy the excitation of different phosphor powders, which can effectively solve the thermal quenching problem of red phosphor powder, make the system better, extend service life, and effectively reduce production costs.

DETAILED DESCRIPTION

It should be understood that the specific embodiments described here are only used to explain the present disclosure, but not to limit the present disclosure. The present disclosure provides a light source system that can effectively solve a thermal quenching problem of the red phosphor powder and a projection device using the light source system, which will be described below in conjunction with specific embodiments.

First Embodiment

Figure 1:
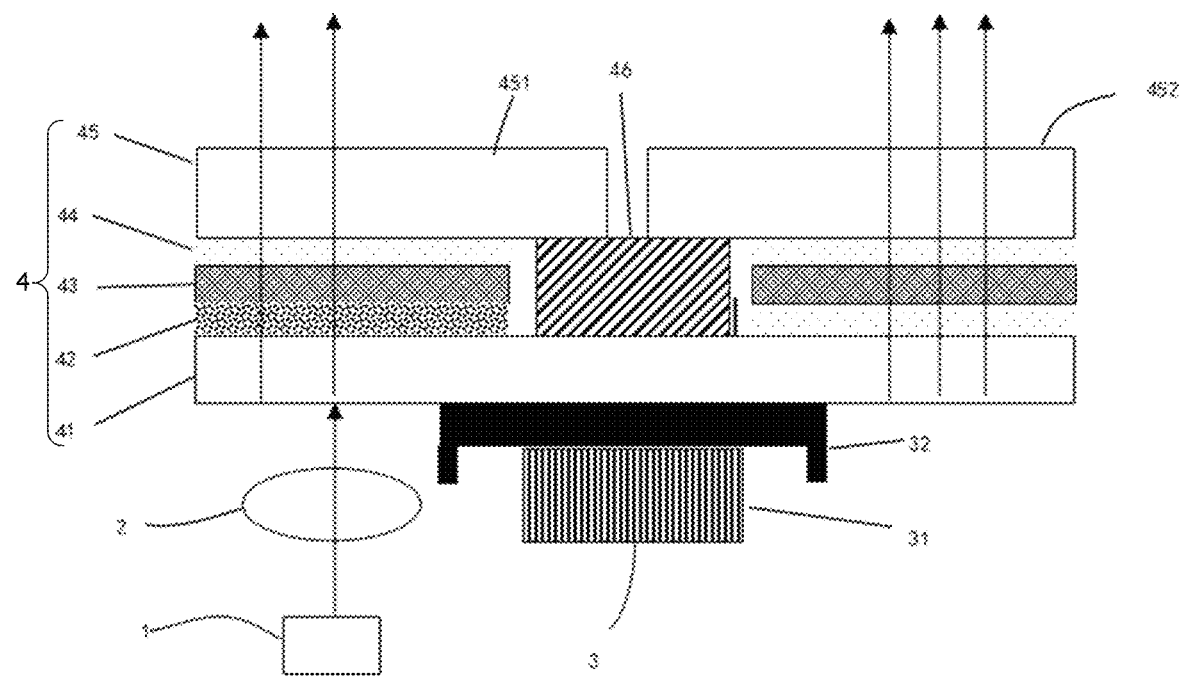
FIG. 1 is a structure diagram of a light source system of the present disclosure.

Referring to FIG. 1, the light source system of the present disclosure includes an excitation light source 1, a relay lens 2, a driving device 3, and a color wheel assembly 4.

The excitation light source 1 is configured to emit excitation light. The excitation light irradiates the color wheel assembly 4 by adjustment of the relay lens 2 to realize wavelength conversion. The driving device 3 includes a driving motor 31 and a motor connecting device 32. The color wheel assembly 4 can rotate at a high speed under the drive of the driving device 3.

The color wheel assembly 4 includes a substrate layer 41, a first gap layer 42, a phosphor layer 43, a second gap layer 44, and a filter layer 45 that are sequentially arranged along an irradiation direction of the excitation light.

The substrate layer 41 is made of sapphire material and an anti-yellow and blue-transmitting layer having a function of reflecting yellow light and transmitting blue light.

Figure 2:
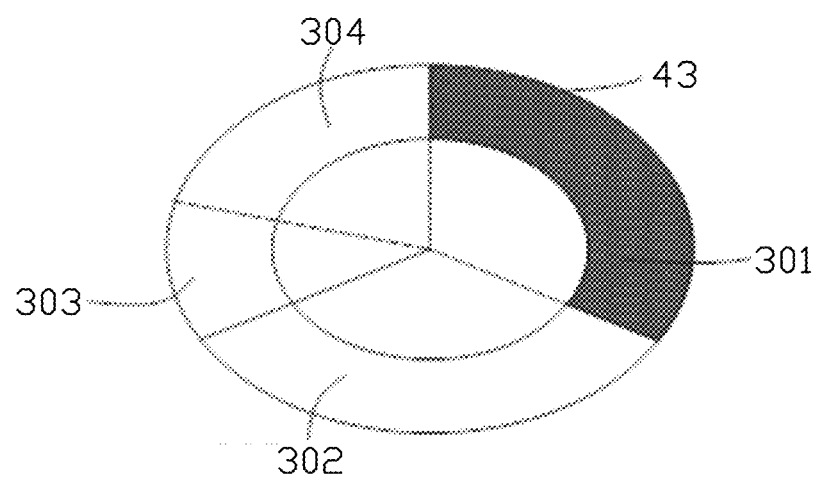
FIG. 2 is a structure diagram of a color wheel assembly of the present disclosure.

Referring to FIG. 2, the phosphor layer 43 includes a red phosphor area 301 with red phosphor powder and at least one non-red phosphor area that are time sequentially on the optical path of the excitation light. In this embodiment, the non-red phosphor area includes a green phosphor area 302, a yellow phosphor area 303, and a blue phosphor area 304. In the working state, the color wheel rotates, different phosphor regions are sequentially on the optical path of the excitation light and irradiated by the excitation light to emit corresponding types of excited light.

Glass powder is provided in the first gap layer 42 and the second gap layer 44. The excitation light incidents on the phosphor area by passing through the first gap layer 42 and excites the phosphor powder to emit excited light, and then the excited light exits through the second gap layer 44. Heat generated by the phosphor powder when excited by the excitation light will be conducted by a medium of the gap layer to dissipate the heat accumulated at the phosphor powder in the phosphor layer.

Figure 3:
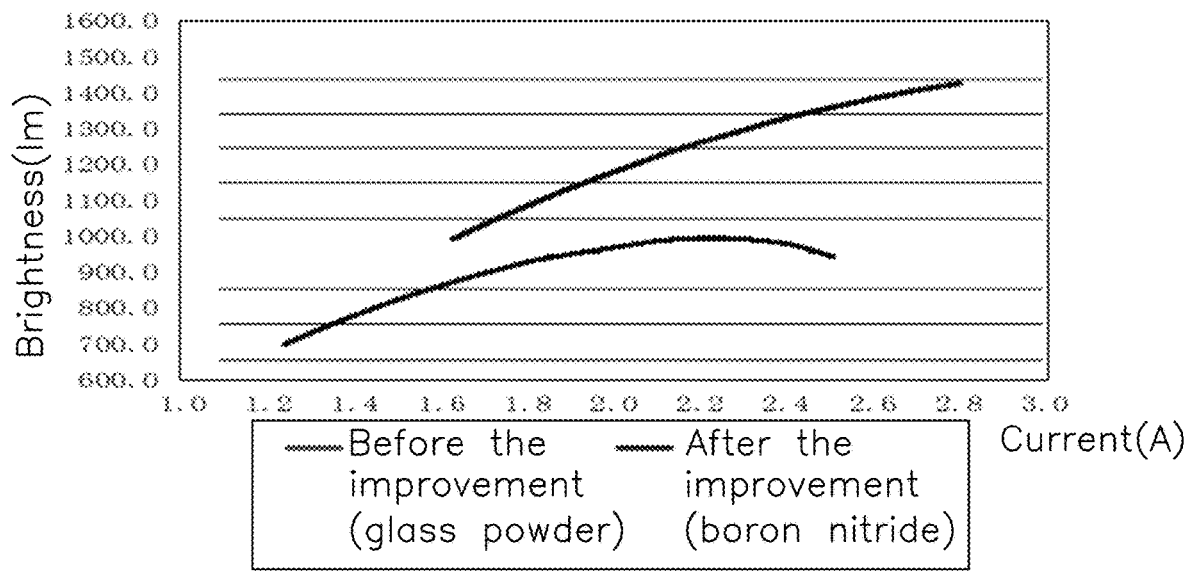
FIG. 3 is a diagram showing effect of red phosphor after boron nitride.

The first gap layer 42 corresponding to the red phosphor area 301 of the present disclosure is provided with boron nitride material. Specifically, in this embodiment, the first gap layer 42 is a boron nitride coating formed by spraying boron nitride on a lower surface of the red phosphor area. In some embodiments, a thickness of the boron nitride coating is 0.01 to 0.030 μm. Since the powder state after spraying is dry powder honeycomb distribution, the incident light can be weakened to a certain extent when passing through the boron nitride coating. As a result, an intensity of the incident light incident on the red phosphor area is reduced, and the attenuation phenomenon caused by thermal quenching of the red phosphor powder is avoided. As shown in FIG. 3, before the improvement, a thermal quenching of the red phosphor occurred under a high-intensity current (a high-intensity excitation light); that is, the intensity of the incident light increases, and the brightness of the red phosphor decreases; while the optical system after spraying the boron nitride coating does not generate thermal quenching of red phosphor under a high-intensity current (a high-intensity excitation light); the brightness of red fluorescence is still increased under high-intensity excitation light current. Under high-intensity excitation photocurrent, the brightness of red fluorescence is still increased. Because boron nitride is in the form of flakes and has good thermal conductivity and strong light shielding properties. Compared with the green/yellow phosphors, the red phosphor has lower luminous efficiency requirements (5% to 25% of white light required in a color wheel product design), so high-intensity excitation light is not required, so that boron nitride shields a part of light does not affect a proportion of red light. It is better to use high-transmittance glass powder as the gap layer for other color segments.

Therefore, the light source system of the present disclosure does not need to specifically reduce the current of the excitation light when the red phosphor area irradiates. Based on experimental verification, after the color wheel assembly of the present disclosure is sprayed with boron nitride, the attenuation ratio will be very low during long-term lighting operation. Specifically, after the color wheel is lighted and aged for 1000 h, the attenuation is within 3%, and the red phosphor attenuation is reduced. The consistency of the color of the color wheel is relatively stable before and after aging, and the parameters such as the brightness of the light source are also very stable. The heat dissipation of the color wheel attenuation is solved, and life of the color wheel is extended.

The glass powder in the non-red phosphor area is also formed on a surface of the phosphor area by spraying. That is, in this embodiment, the first gap layer in the non-red phosphor area is a glass powder coating formed by spraying. The spraying thickness of glass powder is 0.005~0.020 mm. The main purpose of spraying glass powder is to reduce heat generated by the color wheel assembly due to exciting the phosphor powder. Because boron nitride also has a good thermal conductivity, the red phosphor area can be coated only with boron nitride instead of glass powder. Of course, it is also possible to spray both boron nitride and glass powder at the same time. That is, the first gap layer is composed of a mixed coating of boron nitride and glass powder.

The boron nitride has a layered crystal structure similar to graphite. Compared with glass powder and general ceramic materials, boron nitride material has better thermal conductivity, so it can effectively block light due to the characteristics of the crystal structure. The red phosphor powder in the red phosphor area absorbs high-energy laser photons, and generates a lot of heat while releasing low-energy phosphor photons. Compared with the non-red phosphor area, the red phosphor area generates more heat. The heat absorption performance of boron oxide is much higher than the heat absorption performance of glass powder in the non-red phosphor area, and no additional heat dissipation or heat absorption layer is required to ensure a stability of the product's excitation light.

The second gap layer 44 is a glass powder coating formed by spraying glass powder on a surface of the phosphor layer 43 away from the excitation light, and its function is also to reduce the heat generated by the color wheel assembly due to exciting the phosphor powder.

The filter layer 45 is a filter covering the phosphor layer 43 and the second gap layer 44. Specifically, the filter layer 45 includes a first filter 451 attached to the red phosphor area 301 and a second filter 452 attached to the non-red phosphor area. The excited light generated by excitation of the phosphor powder is adjusted by the filter layer 45 to form output light, which realizes emission of the light source system.

Specifically, in this embodiment, the color wheel assembly 4 has a circular sandwich structure, wherein the phosphor layer 43 has a ring structure, the substrate layer 41 has a circular structure, a center of the substrate layer 41 is provided with a fixation glue 46, and the filter layer 45 is bonded to a side of the fixation glue 46 away from the substrate layer 41, so that the color wheel assembly forms a sandwich structure by connection of the fixation glue 46.

The motor connecting device 32 of the driving device 3 is connected to the substrate layer 41, and is driven by the driving motor to drive the color wheel assembly 4 to rotate at a high speed.

Second Embodiment

This embodiment is substantially the same as the first embodiment. The only difference is that in this embodiment, the boron nitride and glass powder in the first gap layer 42 are sprayed on an upper surface of the substrate layer 41, and the spraying thickness of the boron nitride is 0.01~0.050 µm, and the spraying thickness of the glass powder is 0.01~0.050 µm.

The present disclosure has the following beneficial effects: different from the prior art, the red phosphor area of light source system of the present disclosure is provided with a boron nitride coating on one side, glass powder is provided on the other side, and glass powder coatings are provided on both sides of the non-red phosphor area. Compared with glass powder, boron nitride material has better thermal conductivity, and the crystal structure of boron nitride is a layered structure, by arranging boron nitride material at the corresponding position of the red phosphor area, it can effectively block light, and the excitation light incident on the red phosphor powder can be further reduced, which can effectively avoid attenuation of the red fluorescence under direct irradiation of high-intensity excitation light. Therefore, it is not necessary to adjust the intensity of the excitation light specifically for the red phosphor powder, keeping the same excitation light circuit can satisfy the excitation of different phosphor powders, which can effectively solve the thermal quenching problem of red phosphor powder, make the system better, extend service life, and effectively reduce production costs.

The present disclosure also provides a projection device including the above light source system. The light source is stable, the projected image of the product is stable, the reliability is high, and the production cost is low.

The above are only the embodiments of the present disclosure and do not limit the patent scope of the present disclosure. Any equivalent structure or equivalent process transformation made by using the contents of the description and drawings of the present disclosure, or directly or indirectly applied to other related technical fields, are similarly included in the scope of patent protection of the present disclosure.

What is claimed is:

1. A color wheel assembly, comprising:
a phosphor layer configured to receive excitation light and emit excited light,
wherein the phosphor layer comprises a red phosphor area containing a red phosphor area and at least one non-red phosphor area, the red phosphor area and the at least one non-red phosphor area being configured to sequentially get into an optical path of the excitation light according to time sequence, wherein one side of the red phosphor area is provided with a boron nitride coating, the other side of the red phosphor area is provided with a glass powder coating, and both sides of the non-red phosphor area are provided with glass powder coatings wherein the boron nitride coating is not present on either side of the non-red phosphor area.

2. The color wheel assembly of claim 1, further comprising a substrate layer and a filter layer arranged on opposite sides of the phosphor layer, wherein the boron nitride coating is arranged between the substrate layer and the phosphor layer, and the glass powder coating is arranged between the filter layer and the phosphor layer.

3. The color wheel assembly of claim 2, wherein the boron nitride coating is formed by spraying boron nitride on a surface of the phosphor region adjacent to a light source.

4. The color wheel assembly of claim 3, wherein the boron nitride coating has a thickness of 0.01-0.030 µm.

5. The color wheel assembly of claim 2, wherein the boron nitride coating is formed by spraying boron nitride on a surface of the substrate.

6. The color wheel assembly of claim 5, wherein a spraying thickness of the boron nitride is 0.01 to 0.050 µm.

7. The color wheel assembly of claim 2, wherein the glass powder coating on the red phosphor area is formed by spraying glass powder on a surface of the substrate, and a spraying thickness of the glass powder is 0.005 mm to 0.030 mm.

8. The color wheel assembly of claim 2, wherein the substrate layer is made of sapphire and configured to transmit blue light and to reflect yellow light.

9. The color wheel assembly of claim 8, wherein the phosphor layer has a ring structure, and a fixation glue is arranged at a center of the substrate layer, wherein the phosphor layer is arranged around the fixation glue, and the filter layer is attached to a side of the fixation glue facing away from the substrate layer.

10. The color wheel assembly of claim 2, wherein the filter layer comprises filters attached to the red phosphor area and the non-red phosphor area respectively.

11. The color wheel assembly of claim 1, wherein the glass powder coating on the red phosphor area is formed by spraying glass powder on a surface of the phosphor layer away from the excitation light, and a spraying thickness of the glass powder is 0.005 mm to 0.020 mm.

12. The color wheel assembly of claim 1, wherein the non-red phosphor area is any one of a green phosphor area, a yellow phosphor area, and a blue phosphor area.

13. A light source system, comprising an excitation light source and the color wheel assembly of claim 1.

14. A projection device, comprising the light source system of claim 13.

15. The light source system of claim 13, further comprising a substrate layer and a filter layer arranged on opposite sides of the phosphor layer, wherein the boron nitride coating is arranged between the substrate layer and the phosphor layer, and the glass powder coating is arranged between the filter layer and the phosphor layer.

16. The light source system of claim 15, wherein the boron nitride coating is formed by spraying boron nitride on a surface of the phosphor region adjacent to a light source.

17. The light source system of claim 16, wherein the boron nitride coating has a thickness of 0.01-0.030 µm.

18. The light source system of claim 15, wherein, wherein the boron nitride coating is formed by spraying boron nitride on a surface of the substrate.

19. The light source system of claim 18, wherein a spraying thickness of the boron nitride is 0.01 to 0.050 µm.

20. The light source system of claim 13, wherein the glass powder coating corresponding to the red phosphor area is formed by spraying glass powder on a surface of the phosphor layer away from the excitation light, and a spraying thickness of the glass powder is 0.005 mm to 0.020 mm.

* * * * *